US012808446B2

(12) United States Patent
Penno et al.

(10) Patent No.: US 12,808,446 B2
(45) Date of Patent: Nov. 24, 2026

(54) EXPLOSION PRESSURE RELIEF DEVICE

(71) Applicant: REMBE GmbH Safety + Control, Brilon (DE)

(72) Inventors: Stefan Penno, Brilon (DE); Carlo Saling, Aull (DE); Roland Bunse, Brilon (DE)

(73) Assignee: REMBE GmbH Safety + Control, Brilon (DE)

( * ) Notice: Subject to any disclaimer, the term of this patent is extended or adjusted under 35 U.S.C. 154(b) by 21 days.

(21) Appl. No.: 18/934,718

(22) Filed: Nov. 1, 2024

(65) Prior Publication Data

US 2025/0146589 A1 May 8, 2025

(30) Foreign Application Priority Data

Nov. 7, 2023 (EP) .................................... 23208339

(51) Int. Cl.
*F16K 17/40* (2006.01)
*A62C 4/00* (2006.01)
*F16K 17/16* (2006.01)

(52) U.S. Cl.
CPC ................ *F16K 17/40* (2013.01); *A62C 4/00* (2013.01); *F16K 17/16* (2013.01); *F16K 17/403* (2013.01)

(58) Field of Classification Search
None
See application file for complete search history.

(56) References Cited

U.S. PATENT DOCUMENTS 2,068,421 A * 1/1937 Long ........................ A62C 4/00 220/88.2
2,366,669 A * 1/1945 Maude .................... C01B 7/012 422/117
2,571,961 A * 10/1951 Smith ..................... F16K 17/16 220/88.1
2,801,768 A * 8/1957 Immel .................... H01H 9/043 220/88.2
3,398,571 A * 8/1968 Montgomery .......... F16K 13/06 73/12.08
3,817,263 A * 6/1974 Bendler ................ B60R 21/272 280/736
4,067,154 A * 1/1978 Fike, Jr. ................. H05K 5/068 52/99
4,342,988 A * 8/1982 Thompson .............. F16K 17/16 137/554
4,484,690 A * 11/1984 Nash ........................ H05K 5/06 55/491
4,612,739 A * 9/1986 Wilson .................. F16K 17/162 220/89.2

(Continued)

FOREIGN PATENT DOCUMENTS

BE 396067 A 5/1933
DE 102006029356 B3 1/2008

(Continued)

*Primary Examiner* — Matthew W Jellett
(74) *Attorney, Agent, or Firm* — Edell, Shapiro & Finnan, LLC

(57) ABSTRACT

A device for explosion pressure relief of a container, housing, enclosure, or pipeline in which an explosive atmosphere is present or may arise comprises: a flame arrester and a rupture disk arranged behind the flame arrester in a direction in which gases pass through the device in the event of pressure relief.

14 Claims, 3 Drawing Sheets

(56) References Cited

U.S. PATENT DOCUMENTS

| | | | | | |
|---|---|---|---|---|---|
| 5,155,471 | A * | 10/1992 | Ellis | F16K 37/00 137/557 |
| 5,191,990 | A * | 3/1993 | Fritts | F16K 17/16 220/88.1 |
| RE34,308 | E * | 7/1993 | Thompson | F16K 17/1606 137/554 |
| 6,065,773 | A * | 5/2000 | Klinger | F16K 13/06 280/739 |
| 10,537,760 | B2 * | 1/2020 | Barz | B01D 46/12 |
| 11,569,642 | B2 * | 1/2023 | Arnhold | H02B 1/28 |
| 12,009,641 | B2 * | 6/2024 | Arnhold | F16K 13/06 |
| 2003/0077969 | A1 * | 4/2003 | Tanaka | D04H 1/498 442/341 |
| 2009/0173393 | A1 * | 7/2009 | Grabert | F16K 17/162 137/68.23 |
| 2013/0206759 | A1 * | 8/2013 | Wurz | A62C 3/00 220/88.2 |
| 2021/0313780 | A1 * | 10/2021 | Arnhold | H02B 1/28 |
| 2022/0210926 | A1 * | 6/2022 | Arnhold | H02B 1/28 |

FOREIGN PATENT DOCUMENTS

| | | | |
|---|---|---|---|
| FR | 3046081 | A1 | 6/2017 |
| WO | 2017/106204 | A1 | 6/2017 |

* cited by examiner

EXPLOSION PRESSURE RELIEF DEVICE

CROSS REFERENCE TO RELATED APPLICATIONS

This application claims priority under 35 U.S.C. § 119 (a)-(d) to European application No. 23208339.4, filed on Nov. 7, 2023, the entire contents of which are hereby incorporated by reference.

TECHNICAL FIELD

The present disclosure relates to an explosion pressure relief device of a container, a housing, an enclosure, a pipeline or the like in which an explosive mixture, in particular an explosive atmosphere, is present or may arise.

BACKGROUND

Explosive mixtures may be present or arise in containers, housings, and enclosures, for example in production plants, pipelines, etc. during storage or manufacture of goods. It may be that the mixture is formed intentionally, but it may also be that the mixture is formed due to an error or accidentally.

The mixture can ignite unintentionally. The container, housing, enclosure, pipeline, etc. will then explode. Such an explosion can be associated with devastating personal injury and damage to property. Such an incident can result in serious production downtime. In order to minimize such damage and production downtime, devices for explosion pressure relief are useful and, in some cases, even mandatory.

The applicant produces devices for explosion pressure relief under the names "Q-Rohr" and "Q-Box," among others. The device is placed on an opening in the object or device to be protected. A rupture disk of the explosion pressure relief devices closes this opening. In the event of a pressure increase in the object or device to be protected, for example due to an explosion, the rupture disk opens and uncovers the opening through which gases can then escape from the object or device to be protected. The rupture disk in the Q-Rohr or Q-Box is followed by a flame arrester. This flame arrester comprises multiple layers of knitted fabric made of stainless steel, which are held in place by a cage. The cage, through which the layers of knitted fabric made of stainless steel of the flame arrester and the layers of knitted fabric made of stainless steel are held, and the rupture disk enclose a space into which the rupture disk opens.

The arrangement of the flame arrester in the flow path behind the rupture disk has proven itself in the past for several reasons. On the one hand, the flame arrester cannot be contaminated by substances present in the object or device to be protected, in particular dust. The flame arrester arranged behind the rupture disk can be designed such that it provides a large relief opening. The relief opening of the flame arrester can in particular be significantly larger than the relief opening of the opened rupture disk, as a result of which the flow speeds of the gases through the flame arrester can be lower than the flow speeds in the area of the rupture disk, which simplifies the cooling of the hot gases and the extinguishing of the flames.

However, a disadvantage of the well-known Q-Rohr and the well-known Q-Box is that they require a lot of space due to the large-volume flame arrester. In addition, in a dirt-prone environment, dirt can penetrate the flame arrester and thereby impair its function.

SUMMARY

An explosion pressure relief device is disclosed in which contamination of the flame arrester from the outside is not possible and which requires less space than the known Q-Rohr and the known Q-Box. According to the disclosed device, this object is achieved in that the rupture disk is arranged behind the flame arrester in the direction in which gases pass through the device in the event of pressure relief.

The flame arrester is thus protected from external influences by the rupture disk. However, the flame arrester of the device according to the disclosure is not protected in the direction of the volume to be protected from the influences of the processes taking place there. However, since some processes do not lead to contamination of the internal flame arrester, this is not a problem that may arise in every application. In other words, there are processes or applications in which a flame arrester arranged in front of the rupture disk in the direction of relief cannot become contaminated. In other applications, at most a small amount of contamination occurs, which can be tolerated. And in still other applications, the flame arrester can be protected by a non-pressure-resistant cover, for example a film.

The disclosed device is also not as large in volume as the known Q-Box or the known Q-Rohr. This is true, in particular, in cases where the flame arrester substantially forms a cuboid-shaped block that is arranged substantially parallel to the rupture disk. The distance between the flame arrester and the rupture disk can then be smaller compared to the distance in a Q-Rohr or a Q-Box. Although the flow-through area of the flame arrester compared to the rupture disk is then smaller than in the Q-Box or the Q-Rohr, sufficient flow speeds can be ensured in the event of a rupture by appropriately designing the relief area of the rupture disk and the flame arrester.

According to the disclosure, however, it is also possible for the flame arrester to be shaped, for example curved, in the opposite direction to the direction in which gases pass through the device in the event of pressure relief. In contrast to a flat shape of the flame arrester, the flame arrester can then have a larger flow-through area. Since the rupture disk is generally arranged in the plane of the outer wall of the container, housing, enclosure, pipeline, or the like to be protected, the flame arrester then projects inwards and not outwards above the outer wall. This allows the container, housing, enclosure, pipeline, or the like to be protected to be designed more compactly.

According to the disclosure, the flame arrester can have one or more layers of a knitted fabric, woven fabric or similar made of a material that can absorb heat well, for example knitted fabric made of stainless steel. The layer or layers may be enclosed by a frame. The layer or layers may be held by the frame. The frame may be formed from one or more sections with a C-shaped profile. An edge of the one or more layers may be enclosed by the section or sections having the C-shaped profile. Legs of the C-shaped profile may rest against a top and a bottom of the layer or layers.

The flame arrester can have multiple through holes in the area of the edge. Screws or other fastening mechanisms can be passed through these through holes, with which the flame arrester can be attached to the edge of the relief opening in the object or device to be secured such that the layer or layers covers or cover the relief opening in the object or device to be secured. The through holes can be provided in the upper leg of the C-profile, in the lower leg of the C-profile and in the layer or layers. Sleeves can be inserted into the through holes in the layer or layers, which are connected on the one hand to the upper leg and on the other hand to the lower leg of the C-profile. Because the sleeves pass through the through holes in the layer or layers, the frame and the layer or layers are connected to one another. The layer or layers is or are therefore held more or less loosely tensioned in the frame and cannot fall out of the frame.

Housings for machines or enclosures for production plants often serve to protect the environment from sound emissions. The sound generated in the machine or production plant is prevented from spreading by the housing or enclosure. For this purpose, the housings and enclosures are often designed accordingly. They can be multi-layer walls or have walls with sound insulation that prevents the spread of sound.

The explosion pressure relief devices are often a weak point in the soundproofing concepts of such housings or enclosures. These devices often have fabric as a flame arrester and rupture disks that open when the pressure in the housing or enclosure increases, so that the explosion pressure can be released without the housing or enclosure blowing apart. The flame arrester prevents flames from escaping from the housing or enclosure. Neither the rupture disk nor the flame arrester is designed to protect the environment from sound emissions. The sound can therefore escape from such devices and lead to unwanted sound pollution in the environment. The disclosed explosion pressure relief device should therefore be improved so that it provides improved soundproofing.

In a variant of the disclosed device, at least one layer of a sound-absorbing insulating material can be arranged on the rupture disk of the explosion pressure relief device on a side facing the flame arrester or on a side facing away from the flame arrester.

The insulating material can basically be any material suitable for sound insulation. An insulating material that is at least normally flammable, deformable or flexible, has a high resistance to environmental influences such as sunlight or heat, absorbs little or no liquids and/or is closed-cell is particularly suitable. The insulating material can be a PU foam, a silicone foam or an EPDM-based insulating material.

If multiple layers are provided for sound insulation, the layers can comprise the same or different insulating materials.

The deformability of the insulating material or insulating materials is particularly advantageous if the layers are firmly connected to the rupture disk and are therefore deformed together with the rupture disk when the rupture disk bursts.

The insulation material preferably has a low tensile strength, particularly in the areas where the predetermined frangible lines of the rupture disk are provided, so that it can quickly tear when the rupture disk bursts. This can prevent a bursting of the rupture disk from being prevented or delayed by the insulation material. The insulation material may also have frangible lines.

If the insulating material is arranged on the side of the rupture disk facing the flame arrester, a spacer is preferably provided between an edge of the rupture disk provided for fastening the rupture disk and the flame arrester, which sets a distance between the rupture disk and the flame arrester which corresponds to the thickness of the layer or layers of the insulating material. The spacer then creates a space between the flame arrester and the rupture disk that is filled by the layer or layers of insulation material or insulation materials.

The spacer may be a frame which may have a C-shaped profile open to the outside.

The rupture disk may have all the features that a rupture disk described in European patent application 23178734.2 may have. The rupture disk of a device according to the disclosure may be round or rectangular.

BRIEF DESCRIPTION OF THE DRAWINGS

Further features and advantages of an example embodiment of the disclosed device are described below with reference to the drawings.

DETAILED DESCRIPTION

It is not necessary for a device according to the disclosure to have all of the features described below. It is also possible for a device according to the disclosure to have only individual features of the example embodiment described below.

Figure 1:
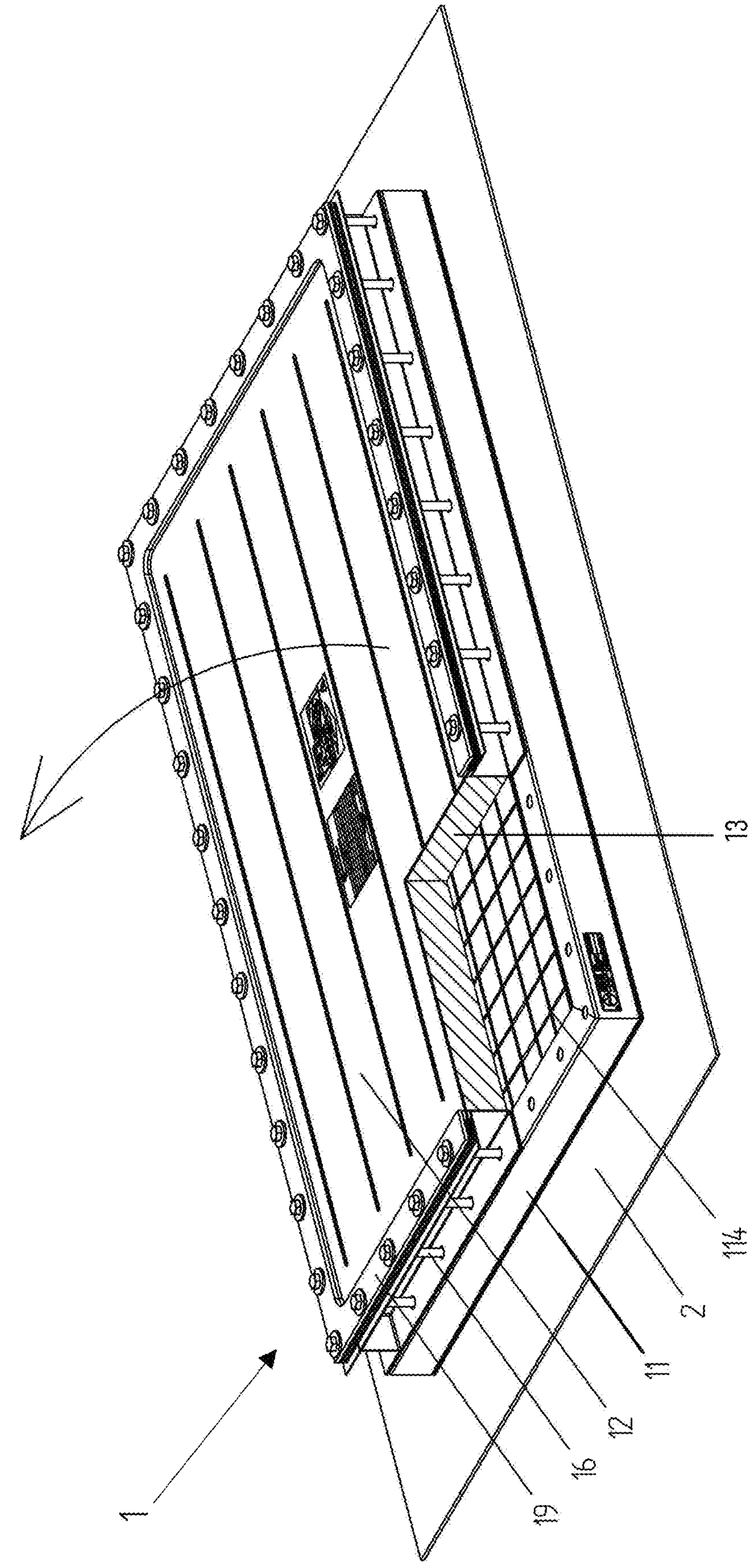
FIG. 1 shows a partially broken perspective illustration of the example embodiment, which is mounted on a wall of a container.
Figure 2:
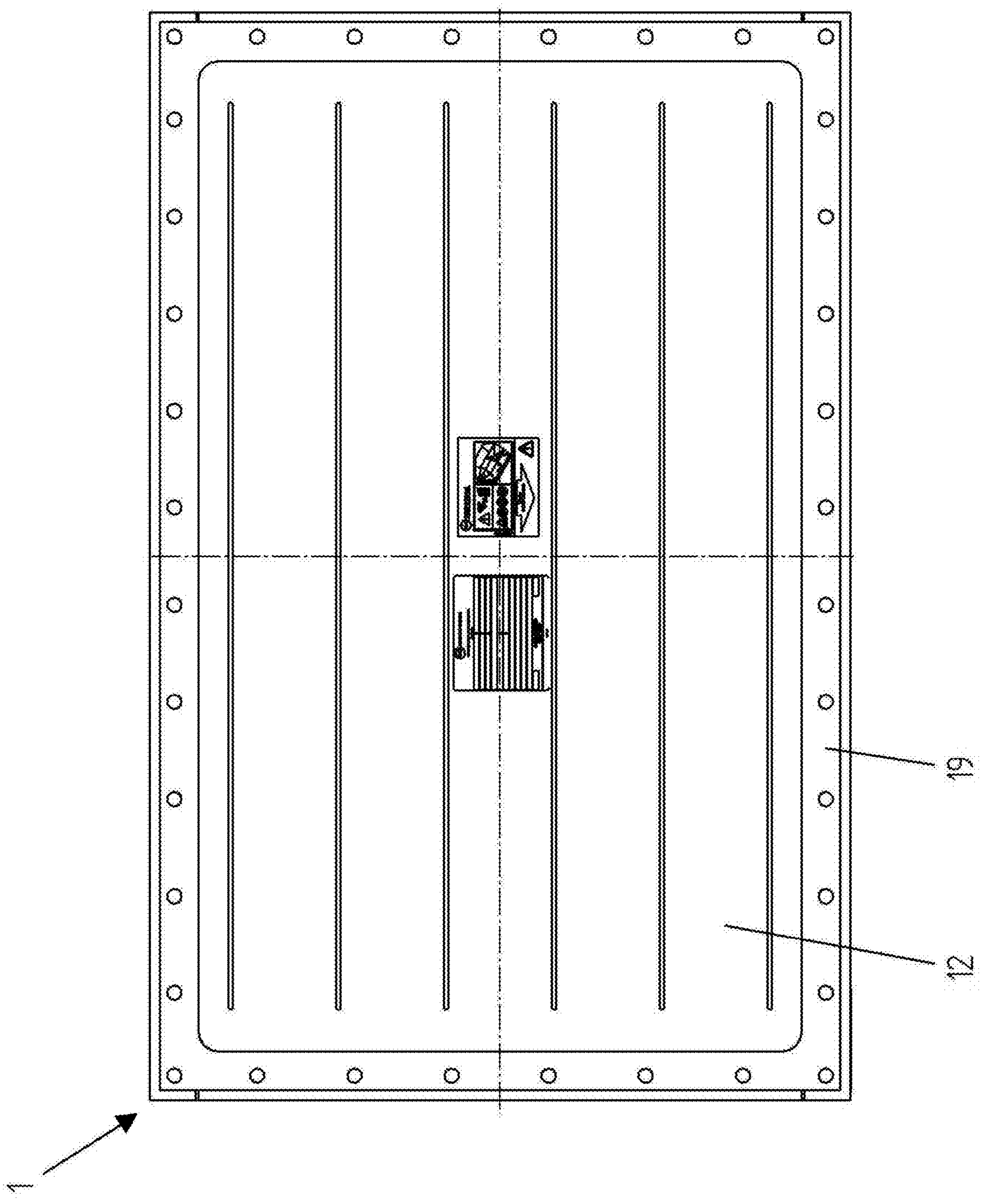
FIG. 2 shows a plan view of the example embodiment.
Figure 3:
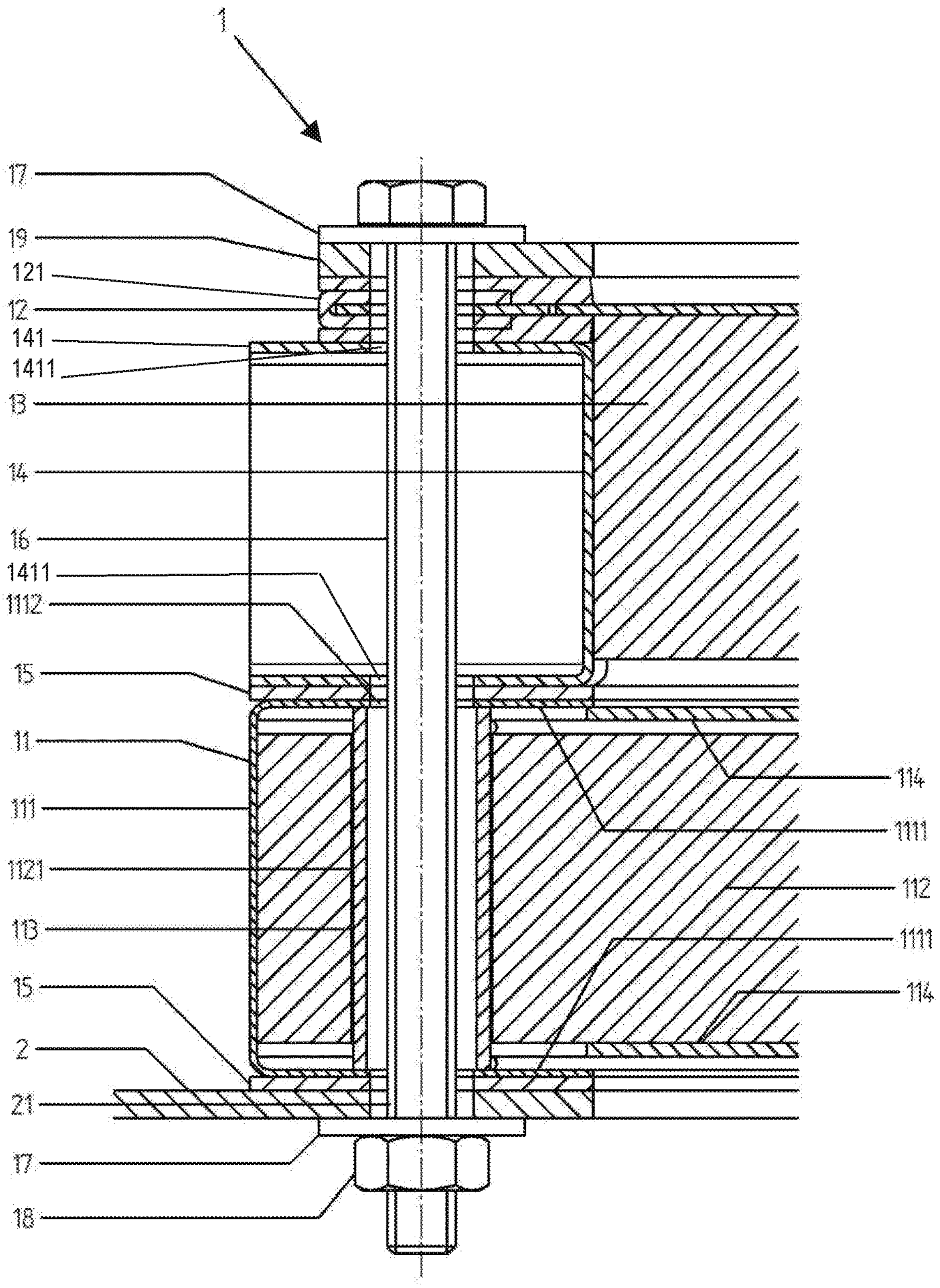
FIG. 3 shows a partial section through the arrangement illustrated in FIG. 1 including the example embodiment mounted on the container wall and the container wall.

The example embodiment of an explosion pressure relief device 1 according to the disclosure of a container illustrated in FIGS. 1-3 has a flame arrester 11, a rupture disk 12, a sound-absorbing insulating material 13, a spacer 14, seals 15 (FIG. 3), screws 16, washers 17 (FIG. 3), nuts 18 (FIG. 3), and a counter frame 19. In the illustrations of FIGS. 1 and 3, device 1 is mounted on a wall 2 of the container which is protected against an uncontrolled explosion by device 1. Device 1 covers a relief opening in wall 2 of the container and closes it.

Through holes 21 are provided in one edge of the relief opening in wall 2 of the container, which are used for fastening device 1 to the wall.

A circumferential seal 15 around the opening rests on the edge of the opening in wall 2 of the container. Flame arrester 11 is arranged on this seal 15.

Flame arrester 11 has a rectangular frame 111 and multiple layers 112 of a knitted fabric made of stainless steel threads or wires. Frame 111 runs around the relief opening in wall 2 of the container and comprises of multiple sections having a C-shaped profile. Legs 1111 of the profile point inwards.

Layers 112, which are not shown individually in FIG. 3 but only as a block, are covered on their side facing the inside of the container and the side facing away from the container by a wide-mesh wire grid 114, which prevents the layers from sagging when arranged horizontally or from moving sideways when arranged vertically.

Through holes 1112, 1121 are also provided in legs 1111 of frame 111 and in layers 112, aligned with holes 21 in the wall of the container. A sleeve 113 is inserted into each of these through holes 1112, 1121. These sleeves 113 can be connected to legs 1111 of frame 111, for example by form-fitting and/or by welding. In particular, when sleeves 113 are connected to legs 1111, layers 112 of the knitted fabric are also firmly connected to frame 111.

A screw 16 for fastening device 1 to wall 2 can be passed through each of sleeves 113 inserted into through holes 1112, 1121, which will be explained in more detail.

A further seal 15 rests on leg 1111 on the side of frame 111 of flame arrester 11 facing away from the container, which can be identical to seal 15 arranged between flame arrester 11 and wall 2. This further seal 15 is followed by spacer 14. Spacer 14 is formed from a frame which is composed of sections having a C-profile. Unlike in the case of frame 111 of flame arrester 11, legs 141 of spacer 14 are directed outwards. Legs 141 have through holes 1411 which are aligned with the through holes in the edge of wall 2 and with the through holes in flame arrester 11.

Rupture disk 12 rests on spacer 14. Rupture disk 12 has a frame 121 and a sealing part 122. Frame 121 of rupture disk 12 is made from sections of sheet metal strips bent over by 180°, which are placed on the edge of sealing part 122. The sealing part is a specially prepared, substantially rectangular sheet metal blank which closes the relief opening of the container during normal operation of the container. Through holes aligned with the holes in wall 2 are provided both in frame 121 and in the edge of sealing part 122.

Counter frame 19 rests on the frame of rupture disk 12. Counter frame 19 is made from sections having a rectangular profile. It has through holes that are aligned with the through holes in wall 2, in rupture disk 12, spacer 14 and flame arrester 11.

Screws 16 are inserted through these aligned through holes and are secured with nuts 18 on the inside of wall 2. Washers 17 are provided between the heads of screws 16 and counter frame 19, and between nuts 18 and wall 2. In this way, device 1 is fastened to the wall.

Sound-absorbing insulation layer 13 is fastened to the side of sealing part 122 of rupture disk 12 facing flame arrester 11. It can be glued to this side of the sealing part 122. The insulation material is a deformable, closed-cell plastic. The thickness of layer 13 is chosen so that it extends almost over the entire height of spacer 14. In the illustrated example embodiment, layer 13 completely fills the space inside spacer 14. However, it is also possible that layer 13 does not rest on the spacer over the entire layer thickness. This can make it easier to open the rupture disk in the event of a pressure relief. It is possible that a gap is provided between layer 13 and spacer 14, which widens in the direction of flame arrester 11.

If the pressure in the container rises above the burst pressure of the rupture disk, the rupture disk 12 opens and the pressure in the container can be relieved by the medium in the container flowing out. If the high pressure in the container has arisen due to an explosion, flames of the explosion are extinguished by the flame arrester and the non-burning and cooled gases can escape through the opened rupture disk.

If, however, the pressure is below the burst pressure and the rupture disk is not opened, the container and the sound-insulated sealing part 112 shield sound waves generated in the container and thus prevent noise from escaping from the container to the outside.

Device 1 takes up little space compared to known solutions and is equally or better suited for many applications than the known Q-Rohr or Q-Box. For other applications, however, the known solutions are more suited.

What is claimed is:

1. A device for explosion pressure relief of a container, housing, enclosure, or pipeline in which an explosive atmosphere is present or may arise, the device comprising:

a flame arrester comprising a flame arrester frame extending around an outer edge of a flame arrester material, the flame arrester frame including through holes positioned to align with edges of a pressure relief opening in an outer wall of the container, housing, enclosure, or pipeline, the through holes being sized to receive fasteners enabling the flame arrester to be secured to the outer wall along the edges of the pressure relief opening; and a rupture disk arranged behind the flame arrester in a direction in which gases pass through the device in an event of pressure relief.

2. The device of claim 1, wherein the flame arrester is shaped substantially as a cuboid block and arranged parallel to the rupture disk.

3. The device of claim 1, wherein the flame arrester material includes one or more layers comprising a knitted fabric or woven fabric.

4. The device of claim 1, wherein the flame arrester frame comprises one or more sections having a C-shaped profile, the through holes being located in parallel upper and lower portions of the C-shaped profile of the flame arrester frame.

5. The device of claim 1, further comprising:

a sound-absorbing insulating material to absorb sound transmission via the device, the sound-absorbing insulating material comprising at least one layer and being arranged on the rupture disk on a side facing the flame arrester or on a side facing away from the flame arrester.

6. The device of claim 5, wherein the sound-absorbing insulating material is deformable or flexible, resists environmental influences, and/or is closed-cell.

7. The device of claim 5, wherein the sound-absorbing insulating material is a polyurethan (PU) foam, a silicone foam, or an ethylene-propylene diene monomer (EPDM)-based insulating material.

8. The device of claim 5, wherein, where the sound-absorbing insulating material is arranged on the side of the rupture disk facing the flame arrester, a spacer is positioned between an edge of the rupture disk, the spacer setting a distance between the rupture disk and the flame arrester which substantially corresponds to a thickness of the at least one layer of the sound-absorbing insulating material.

9. The device of claim 8, wherein the spacer is a frame having a C-shaped profile open to an outside of the device.

10. An arrangement comprising:

the device of claim 1; and the container, housing, enclosure, or pipeline, wherein the device is arranged to span a relief opening in a wall of the container, housing, enclosure, or pipeline.

11. The device of claim 1, wherein:

the flame arrester material provides a first relief opening through which gases pass in the event of pressure relief;

the rupture disk provides a second relief opening through which gases pass in the event of pressure relief; and the first relief opening is larger than the second relief opening, such that gas flow speeds through the flame arrester are lower than gas flow speeds through the rupture disk.

12. The device of claim 1, wherein the flame arrester further comprises a non-pressure resistant cover to prevent contamination.

13. The device of claim 1, wherein the device is mountable external to the outer wall of the container, housing, enclosure, or pipeline.

14. The device of claim 1, wherein the rupture disk comprises a rupture disk frame extending around an outer edge of a rupturable sealing part, the rupture disk frame including through holes aligned with the through holes of the flame arrester frame and sized to receive the fasteners to enable the rupture disk to be secured to the outer wall of the container, housing, enclosure, or pipeline.

* * * * *